United States Patent [19]
Parfree et al.

[11] 4,371,234
[45] Feb. 1, 1983

[54] SUBMARINE OPTICAL CABLE

[75] Inventors: Colin S. Parfree; Peter Worthington, both of Southampton, England

[73] Assignee: International Standard Electric Corporation, New York, N.Y.

[21] Appl. No.: 206,425

[22] Filed: Nov. 13, 1980

[30] Foreign Application Priority Data

Nov. 15, 1979 [GB] United Kingdom ............... 7939606

[51] Int. Cl.³ .............................................. G02B 5/16
[52] U.S. Cl. ............................... 350/96.23; 350/96.24
[58] Field of Search ........................... 350/96.23, 96.24

[56] References Cited

U.S. PATENT DOCUMENTS

4,097,119  6/1978  Kumamaru et al. ............. 350/96.23

FOREIGN PATENT DOCUMENTS

1172272  11/1979  United Kingdom ............. 350/96.23

OTHER PUBLICATIONS

Katsuyama et al.-"Single-Mode Optical Fiber Cable", Applied Optics/vol. 18, No. 13/Jul. 1, 1979; pp. 2232-2236.

*Primary Examiner*—Marvin L. Nussbaum
*Attorney, Agent, or Firm*—John T. O'Halloran; Robert P. Seitter

[57] ABSTRACT

An optical fiber cable intended for submarine use has a central cylindrical strength member (1) over which are laid the optical fibers (2). These are within a sheath 3, itself within an aluminum tube (4), usable to convey electrical power for repeaters. On the outside of this tube we have a layer of high tensile steel wires (5), surrounded by a layer of low density polyethylene.

In a cable for shallower waters where the risk of damage is greater than in deep water the polyethylene layer is surrounded by a layer of armouring wires separated from the polyethylene by bedding material and enclosed by a layer of binding material.

4 Claims, 2 Drawing Figures

SUBMARINE OPTICAL CABLE

BACKGROUND OF THE INVENTION

This invention relates to optical fiber cables, and especially to such cables for submarine use.

Such cables have to have a reasonable degree of flexibility, and should be resistant to high pressures and to the action of the sea. In addition, repeaters are needed at intervals determined by the attenuation of the optical fibers, which repeaters are processed electrically so that electrical conductors need to be incorporated into the cable.

An object of the invention is to provide a cable which meets the above requirements in an economical manner.

According to the invention there is provided an optical fiber cable, especially for submarine use, which includes a central cylindrical strength member, a number of coated optical fibers overlaying the surface of said strength member, a metallic tube enclosing and overlaying said optical fibers, and a sheath which encloses said metallic tube.

BRIEF DESCRIPTION OF THE DRAWINGS

Embodiments of the invention will now be described with reference to the drawings, in which FIG. 1 is a lightweight cable embodying the invention, intended for deep water use, while

DESCRIPTION OF THE PREFERRED EMBODIMENTS

Figure 1:
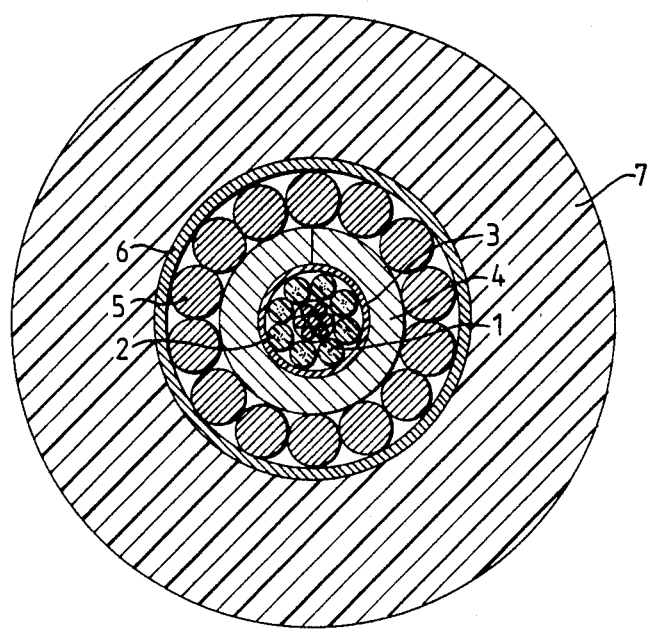

The cable shown in cross-section in FIG. 1 is a relatively lightweight cable intended for deep water use. This cable has a central strength member 1 which in the cable shown is nylon covered steel strands, although in an alternative arrangement the strands are of a fibrous nature. On the outer surface of this strength member there are a number, eight as shown, of poly-propylene-coated optical fibers 2. These fibers are provided with a MYLAR (Registered Trademark) wrap, MYLAR being a polyester, which serves to hold those fibers together and in place during the aperture in which they are stranded into place.

The optical fibers are enclosed by a sheath 3 of another polyester, sold under the Registered Trademark HYTREL. This sheath 3 is itself enclosed by an aluminum tube which is a C-section which is fitted over the sheath 3, and then closed, possibly welded up, to form a tube. This aluminum tube is usable as an electrical conductor for power for repeaters, in addition to functioning as a strength member.

On the outer surface of the tube 4 there is a layer of high tensile steel wires 5, fourteen as shown, and these are enclosed by a welded copper tube 6, which is itself enclosed by a layer of low-density polyethylene 7.

The dimensions of the various portions of the cable just described are as follows:

| | | |
|---|---|---|
| (1) | Central Strength Member | 1.80 mm diameter |
| (2) | Polypropylene coated fiber | 1.00 mm diameter |
| | MYLAR wrap | 3.90 ± 0.05 mm diameter |
| (3) | HYTREL sheath | 4.25 ± 0.05 mm diameter |
| (4) | Aluminum tube | 4.30 mm internal diameter |
| | | 7.47 mm outside diameter |
| (5) | Welded Copper Tube | 12.14 mm outside diameter |
| (6) | Polyethylene | 26.40 mm outside diameter |

Figure 2:
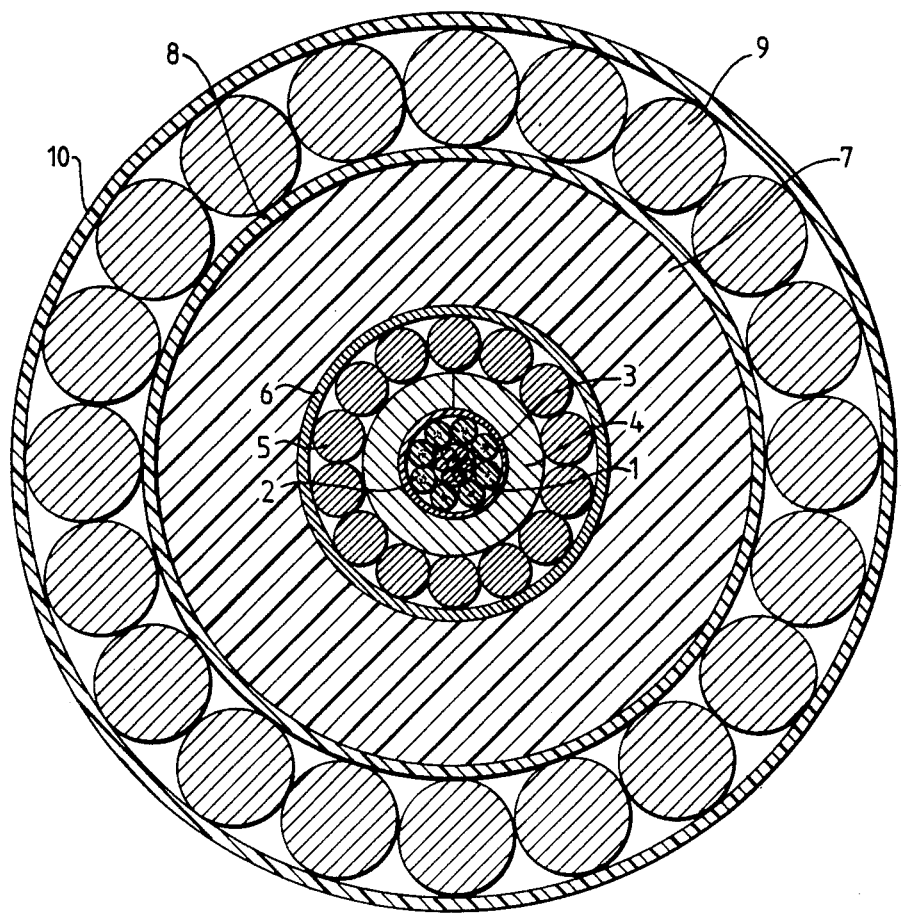
FIG. 2 is an armoured cable embodying the invention and intended for use in shallow waters. In both cases we show a cross-section of the cable.

We now turn to the shallow water cable, FIG. 2, which has additional armouring to cater for the greater risks of damage which exist in shallow waters than in deep water. This cable is similar to that shown in FIG. 1, but has three additional integers to provide the armouring. There is a layer 8 of a bedding material such as jute or polypropylene fibers, over which there is a layer 9 of steel armouring wires and a layer 10 which is also of polypropylene or jute fibers.

We claim:

1. An optical fiber cable including a central cylindrical strength member, a plurality of coated optical fibers laying about the surface of said strength member, a layer of thermoplastic or rubber-like material enclosing the optical fibers, a metallic tube enclosing and laying about said layer, said tube being usable as an electrical conductor, a layer of high tensile steel wires laying about said metallic tube, a further tube of metal enclosing said layers of wires, and a sheath of an insulating material laying about said further metal tube.

2. A cable as claimed in claim 1, which also includes a tubular layer of a bedding material laying about said layer of insulating material, a layer of armouring wires laying about said layer of bedding material, and a layer of a binding material laying about and enclosing said armouring wires.

3. A cable as claimed in claim 1 or 2, and in which the central strength member is an assembly of fibers.

4. A cable as claimed in claim 1 or 2, and in which the central strength member is a steel strength member coated with an electrically insulating material.

* * * * *